United States Patent
Ye et al.

(10) Patent No.: US 9,812,977 B2
(45) Date of Patent: Nov. 7, 2017

(54) RESONANT CONVERTERS WITH AN IMPROVED VOLTAGE REGULATION RANGE

(71) Applicant: Futurewei Technologies, Inc., Plano, TX (US)

(72) Inventors: Liming Ye, Frisco, TX (US); Heping Dai, Plano, TX (US); Dianbo Fu, Plano, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 15 days.

(21) Appl. No.: 14/676,515

(22) Filed: Apr. 1, 2015

(65) Prior Publication Data
US 2016/0294294 A1 Oct. 6, 2016

(51) Int. Cl.
*H02M 3/335* (2006.01)
*H02M 1/00* (2006.01)

(52) U.S. Cl.
CPC ......... *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ....... H02M 3/33546; H02M 2001/007; H02M 3/33584; Y02B 70/1433
See application file for complete search history.

(56) References Cited

U.S. PATENT DOCUMENTS

| 5,907,481 A | * | 5/1999 | Svardsjo | H02M 3/33592 363/126 |
| 6,452,815 B1 | * | 9/2002 | Zhu | H02M 1/34 363/17 |
| 7,042,199 B1 | * | 5/2006 | Birchenough | H02M 3/1582 323/271 |
| 7,145,786 B2 | | 12/2006 | Vinciarelli | |
| 7,173,831 B1 | * | 2/2007 | Vogman | H02M 3/33592 363/131 |
| 7,196,914 B2 | | 3/2007 | Ren et al. | |

(Continued)

OTHER PUBLICATIONS

Labella, T., et al., "A Hybrid Resonant Converter Utilizing a Bidirectional GaN AC Switch for High-Efficiency PC Applications," IEEE Transactions on Industry Applications, vol. 50, No. 5. Sep./Oct. 2014, pp. 3468-3475.

(Continued)

*Primary Examiner* — Fred E Finch, III
*Assistant Examiner* — Demetries A Gibson
(74) *Attorney, Agent, or Firm* — Slater Matsil, LLP (57) ABSTRACT

A method comprises determining an operating mode based upon an input voltage and an output voltage of a resonant converter, wherein the resonant converter comprises a switch network coupled to an input dc power source, a resonant tank coupled to the switch network and a transformer coupled between the resonant tank and a secondary rectifier, wherein the secondary rectifier is a full-bridge rectifier, configuring the switch network to operate at a buck converter mode in response to a first input voltage and configuring the secondary rectifier to operate at a boost converter mode in response to a second input voltage, wherein the first voltage is higher than the output voltage and the second voltage is lower than the output voltage.

19 Claims, 9 Drawing Sheets

(56) References Cited

U.S. PATENT DOCUMENTS

| | | | |
|---|---|---|---|
| 7,742,318 B2 | 6/2010 | Fu et al. | |
| 7,859,861 B2 * | 12/2010 | Taurand | H02M 3/33576 363/17 |
| 9,130,470 B2 * | 9/2015 | Rosado | H02M 3/33584 |
| 9,490,704 B2 * | 11/2016 | Jang | H02M 3/285 |
| 9,537,401 B2 * | 1/2017 | Hembach | H02M 3/33592 |
| 2002/0159280 A1 * | 10/2002 | Zhu | H02M 1/34 363/98 |
| 2003/0198064 A1 * | 10/2003 | Zhu | H02M 3/33576 363/21.01 |
| 2011/0090717 A1 * | 4/2011 | Lee | H02M 3/33584 363/21.02 |
| 2013/0107581 A1 * | 5/2013 | Krause | H02M 1/12 363/17 |
| 2016/0094136 A1 * | 3/2016 | Fu | H02M 3/1582 363/21.02 |

OTHER PUBLICATIONS

McDonald, B., et al., "LLC Performance Enhancements with Frequency and Phase Shift Modulation Control," Applied Power Electronics Conference and Exposition (APEC), Mar. 16-20, 2014, pp. 2036-2040.

Jang, Y., et al., "Series-Resonant Converter with Reduced-Frequency-Range Control," downloaded Apr. 14, 2015, pp. 1453-1460.

* cited by examiner

RESONANT CONVERTERS WITH AN IMPROVED VOLTAGE REGULATION RANGE

TECHNICAL FIELD

The present invention relates to a resonant converter, and, in particular embodiments, to an LLC resonant converter with a buck converter operating mode and a boost converter operating mode.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency). An LLC resonant converter is capable of reducing switching losses through zero voltage switching and/or zero current switching when the LLC resonant converter operates at a fixed switching frequency approximately equal to its resonant frequency. Under such a fixed switching frequency, the LLC resonant converter is unregulated because the gain of the LLC resonant converter is fixed and the fixed gain cannot regulate the output over wide line and load variations.

SUMMARY OF THE INVENTION

These and other problems are generally solved or circumvented, and technical advantages are generally achieved, by preferred embodiments of the present invention which provide a control method for regulating an output voltage of an inductor-inductor-capacitor (LLC) resonant power converter.

In one embodiment, an operating mode is determined based upon an input voltage and an output voltage of a resonant converter. The resonant converter a switch network coupled to an input dc power source, a resonant tank coupled to the switch network and a transformer coupled between the resonant tank and a secondary rectifier, wherein the secondary rectifier is a full-bridge rectifier, configuring the switch network to operate at a buck converter mode and configuring the secondary rectifier to operate at a boost converter mode.

In accordance with another embodiment, a switching network is configured to be connected with an input dc power source, a resonant tank coupled between the switching network and a primary side of a transformer and a rectifier coupled between a secondary side of the transformer and an output capacitor. The switch network is configured to operate at a buck converter mode in response to a first input voltage and the rectifier is configured to operate at a boost converter mode in response to a second input voltage, wherein the first voltage is higher than a voltage across the output capacitor and the second voltage is lower than the voltage across the output capacitor.

In accordance with yet another embodiment, a method comprises providing a resonant converter comprising a switch network coupled to an input dc power source, a resonant tank coupled to the switch network and a transformer coupled between the resonant tank and a secondary rectifier, wherein the secondary rectifier is a full-bridge rectifier.

The method further comprises in response to an output voltage of the input dc power source, determining an operating mode, configuring the switch network to operate at a buck converter mode in response to a first input voltage and configuring the secondary rectifier to operate at a boost converter mode in response to a second input voltage, wherein the first voltage is higher than an output voltage of the resonant converter and the second voltage is lower than the output voltage of the resonant converter.

An advantage of a preferred embodiment of the present invention is to enhance the voltage regulation of an LLC resonant converter through the addition of the boost converter operating mode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a control method for improving the voltage regulation range of an inductor-inductor-capacitor (LLC) resonant converter. The invention may also be applied, however, to a variety of resonant converters. Hereinafter, various embodiments will be explained in detail with reference to the accompanying drawings.

Figure 1:
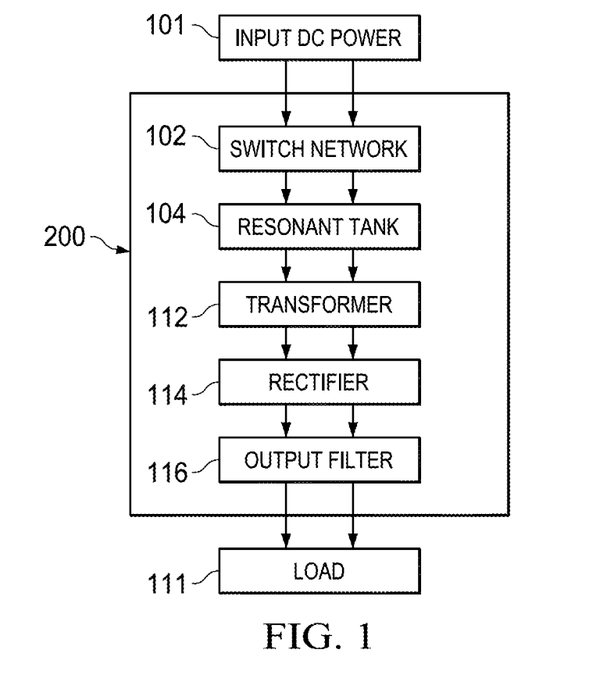
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input dc power source 101 and the load 111.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The resonant tank 104 may be implemented in a variety of ways. For example, the resonant tank 114 may comprise a series resonant inductor, a parallel resonant inductor and a series resonant capacitor (shown in FIG. 2 respectively). Alternatively, the resonant tank 104 may comprise a multiple element resonant tank such as an LCLCL resonant tank, an LCCL resonant tank and/or the like.

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

In some embodiments, the resonant tank 104 includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer 112 is of a single secondary winding, the rectifier 114 may be a full-bridge rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

Figure 2:
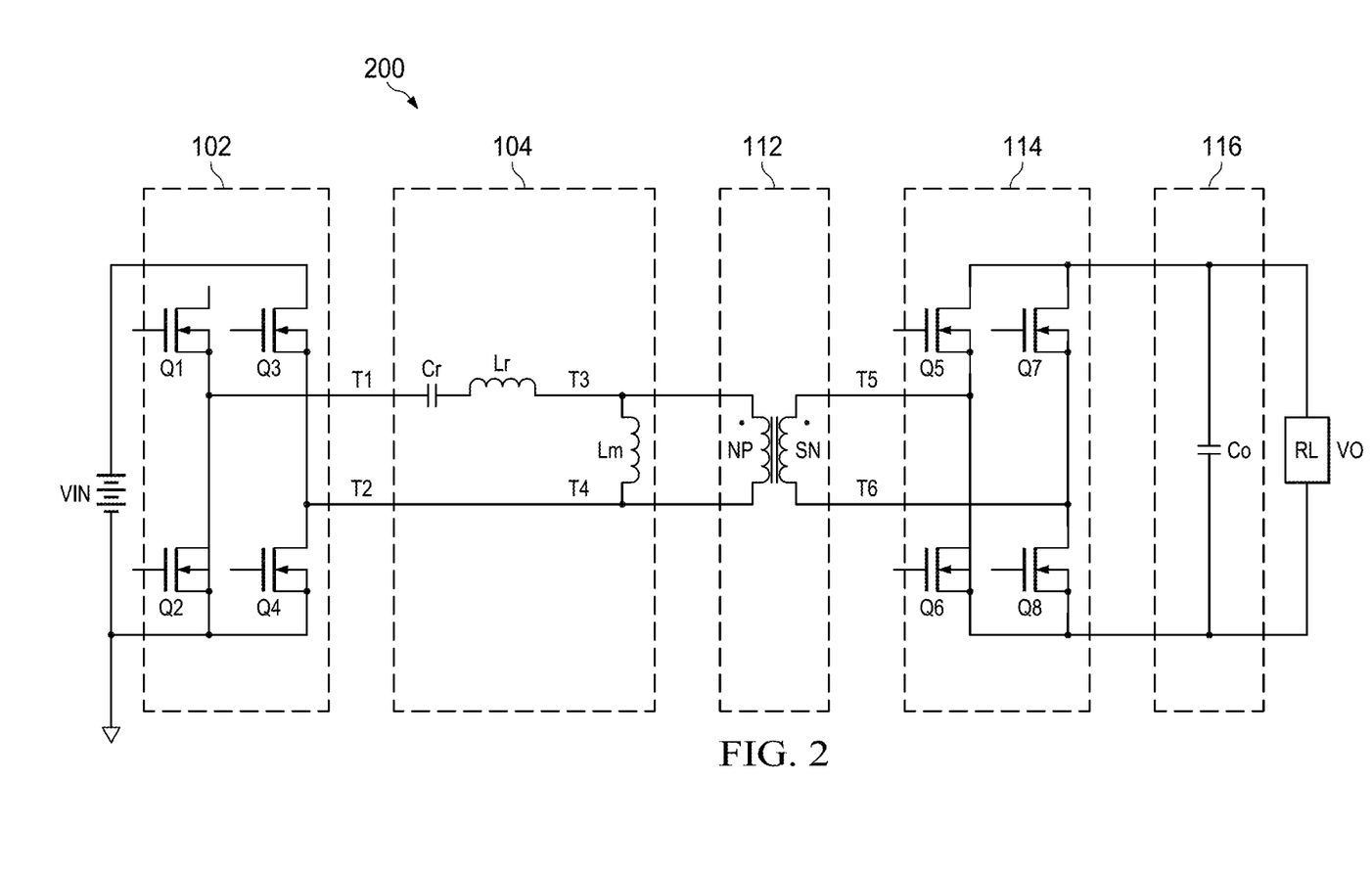
FIG. 2 illustrates a schematic diagram of the LLC resonant converter shown in FIG. 1 in accordance with various embodiments of the present disclosure.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like. Furthermore, other rectifiers, such as non-synchronous rectifiers, may alternatively be used. In sum, any suitable rectifiers may be used, and all such rectifiers are fully intended to be included within the scope of the embodiments discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

FIG. 2 illustrates a schematic diagram of the LLC resonant converter shown in FIG. 1 in accordance with various embodiments of the present disclosure. The switch network 102 includes four switching elements, namely Q1, Q2, Q3 and Q4. As shown in FIG. 2, a first pair of switching elements Q1 and Q2 are connected in series. A second pair of switching elements Q3 and Q4 are connected in series. The common node of the switching elements Q1 and Q2 is coupled to a first input terminal T1 of the resonant tank 104. Likewise, the common node of the switching elements Q3 and Q4 is coupled to a second input terminal T2 of the resonant tank 104.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the resonant tank 104 is coupled between the switch network 102 and the transformer 112. The resonant tank 104 is formed by a series resonant inductor Lr, a series resonant capacitor Cr and a parallel inductance Lm. As shown in FIG. 2, the series resonant inductor Lr and the series resonant capacitor Cr are connected in series and further coupled to the primary side of the transformer 112.

It should be noted while FIG. 2 shows the series resonant inductor Lr is an independent component, the series resonant inductor Lr may be replaced by the leakage inductance of the transformer 112. In other words, the leakage inductance (not shown) may function as the series resonant inductor Lr.

It should further be noted while FIG. 2 shows the resonant tank is placed on the primary side of the LLC resonant converter 200, this diagram is merely an example. A person skilled in the art will recognize many variations, alternatives and modifications. For example, the resonant tank may be placed on the secondary side. Furthermore, the resonant tank may be placed on both sides of the transformer 112.

The transformer 112 may be of a primary winding $N_P$ and a secondary winding $N_S$. The primary winding is coupled to terminals T3 and T4 of the resonant tank 104 as shown in FIG. 2. The secondary winding is coupled to the load 111 through the rectifier 114, which is a full-bridge rectifier comprising switches Q5, Q6, Q7 and Q8.

As shown in FIG. 2, switches Q5 and Q6 are connected in series and further coupled between two terminals of the output capacitor Co. Switches Q7 and Q8 are connected in series and further coupled between the two terminals of the output capacitor Co. The common node T5 of the switches Q5 and Q6 is coupled to a first terminal of the secondary winding of the transformer 112. Likewise, the common node T6 of the switches Q7 and Q8 is coupled to a second terminal of the secondary winding of the transformer 112.

It should be noted the transformer structure shown in FIG. 2 is merely an example. One person skilled in the art will recognize many alternatives, variations and modification. For example, the secondary side of the transformer 112 may be a center tapped transformer winding. As a result, the secondary side may employ a synchronous rectifier formed by two switching elements. The operation principle of a synchronous rectifier coupled to a center tapped transformer winding is well known, and hence is not discussed in further detail herein to avoid repetition.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

The LLC resonant converter 200 is fully regulated through configuring the LLC resonant converter 200 to operate at two different operating modes. More particularly, when an input voltage from the input dc power source 101 is higher than a voltage threshold, the LLC resonant converter 200 is configured to operate at a buck converter mode. During the buck converter mode, the regulation of the LLC resonant converter 200 is achieved through a variety of control methods such as PWM control mechanisms and/or frequency modulation control mechanisms. The frequency modulation control mechanisms of LLC resonant converters are well known in the art, and hence are not discussed in detail herein to avoid unnecessary repetition. The PMW control mechanisms of the LLC resonant converter 200 will be described below with respect to FIGS. 6-9.

On the other hand, when the input voltage from the input dc power source 101 is lower than the voltage threshold, the LLC resonant converter 200 is configured to operate at a boost converter mode. During the boost converter mode, the regulation of the output voltage of the LLC resonant converter 200 is achieved through forcing the LLC resonant converter to operate in a manner similar to a boost converter. The operating principle of the boost converter mode will be described in detail below with respect to FIG. 3.

It should be noted that when the input voltage from the input dc power source 101 is approximately equal to the output voltage of the LLC resonant converter 200, and the transformer turns ratio is 1:1, the LLC resonant converter 200 may operate at the buck converter, the boost converter mode and/or any combinations thereof.

One advantageous feature of the multiple operating modes described above is the LLC resonant converter 200 is capable of achieve high efficiency in wide input and output voltage ranges through employing multiple operating modes. The LLC resonant converter 200 may operate a fixed switching (e.g., the resonant frequency of the LLC resonant converter). The LLC resonant converter 200 may achieve high efficiency through zero voltage switching and/or zero current switching of the primary switches, and zero voltage switching and/or zero current switching of the secondary switches.

Figure 3:
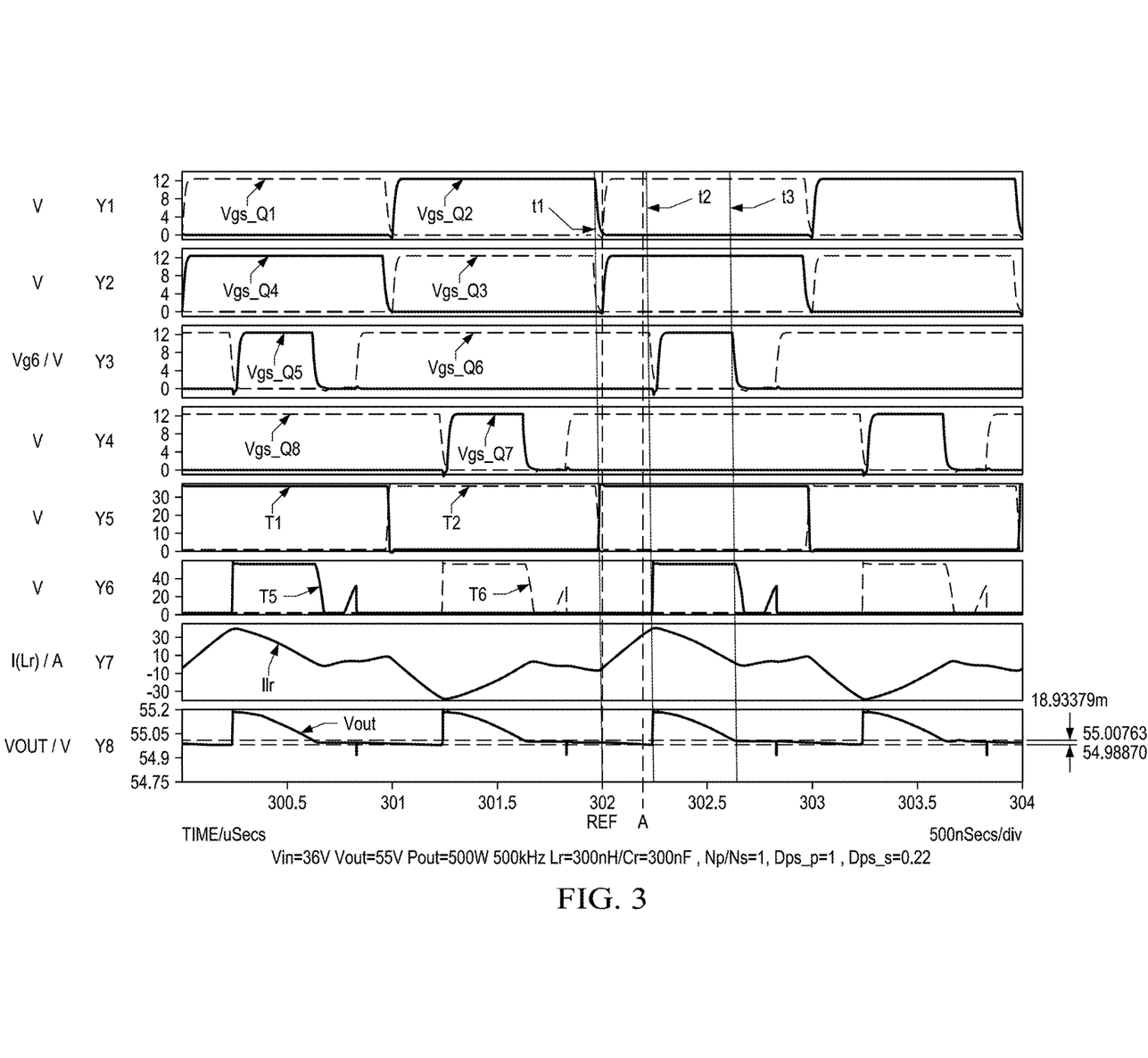
FIG. 3 illustrates switching waveforms of the LLC resonant converter operating at full load in a boost converter mode in accordance with various embodiments of the present disclosure.

FIG. 3 illustrates switching waveforms of the LLC resonant converter operating at full load in a boost converter mode in accordance with various embodiments of the present disclosure. The horizontal axis of FIG. 3 represents intervals of time. The unit of the horizontal axis is nanosecond. There may be eight vertical axes. The first vertical axis Y1 represents the gate drive signals of primary switches Q1 and Q2. The second vertical axis Y2 represents the gate drive signals of primary switches Q3 and Q4. The third vertical axis Y3 represents the gate drive signals of secondary switches Q5 and Q6. The fourth vertical axis Y4 represents the gate drive signals of secondary switches Q7 and Q8.

The fifth vertical axis Y5 represents switching waveforms at nodes T1 and T2 shown in FIG. 2. The sixth vertical axis Y6 represents switching waveforms at nodes T5 and T6 shown in FIG. 2. The seventh vertical axis Y7 represents the current flowing through the resonant inductor Lr. The eighth vertical axis Y8 represents the output voltage of the LLC resonant converter 200.

In some embodiments, the number of turns Np of the primary side winding of the transformer 112 is equal to the number of turns Ns of the secondary side winding of the transformer 112. The input voltage of the LLC resonant converter 200 is 36 V. The output voltage of the LLC resonant converter 200 is 55 V. Depending on different applications and design needs, the full load of the LLC resonant converter 200 may vary. For example, the full load may be in a range from 10 A to 30 A. Since the output voltage (55 V) is greater than the input voltage (36 V), the LLC resonant converter 200 is configured to operate in a boost converter mode.

In some embodiments, the inductance of the resonant inductor Lr is equal to 300 nH. The capacitance of the resonant capacitor Cr is equal to 300 nF. The switching frequency of the LLC resonant converter 200 is equal to 500 KHz. The max power delivered by the LLC resonant converter 200 is equal to 500 W. The primary side switches' duty cycle is approximately equal to 1. The secondary side switches' boost operation duty cycle is approximately equal to 0.22.

It should be noted that the values given above are selected purely for demonstration purposes and are not intended to limit the various embodiments of the present invention to any particular values. A person skilled in the art will recognize that, depending on different application and design needs, the values (e.g., capacitance and inductance) recited above may be changed to different values.

As shown in FIG. 3, the gate drive signals of Q1, Q2, Q3 and Q4 indicate the primary switches Q1 and Q4 are fully turned on for one half of the switching cycle, and the primary switches Q2 and Q3 are fully turned on for the other half of the switching cycle. In other words, the primary side switches operate at the max duty cycle of the LLC resonant converter 200. The gate drive signals of Q5, Q6, Q7 and Q8 indicate the secondary switches function as a synchronous rectifier to convert an alternating polarity waveform received from the output of the transformer 112 to a single polarity waveform. In addition, the secondary switches also provide a scheme for achieving the boost converter operation mode. In particular, as shown in FIG. 3, at the beginning of each switching period (e.g., t1 as shown in FIG. 3), switches Q6 and Q8 are simultaneously turned on and remain the on-state for a period (e.g., the period from t1 to t2 as shown in FIG. 3). Throughout the description, the period from t1 to t2 is alternatively referred to as a TBOOST period. During the TBOOST period, switches Q5 and Q7 are turned off to prevent shoot-through.

During the TBOOST period, switches Q1 and Q4 are in the on-state. Referring back to FIG. 2, the turned-on switches Q1 and Q4 lead to a positive voltage applied to the input terminals of the resonant tank. At the same time, the turned-on switches Q6 and Q8 may short the secondary side winding of the transformer 112. Since the secondary side voltage of the transformer 112 is approximately equal to zero during the period from t1 to t2, the reflected voltage at the primary side of the transformer 112 is approximately equal to zero. As a result, the input voltage is directly applied to the resonant tank. In response to such a voltage applied to the resonant tank, the current flowing through the resonant inductor Lr ramps up quickly in a manner similar to the current flowing through a boost inductor during the on period of a boost converter.

During the period from t1 to t2, the energy is accumulated in the resonant inductor Lr. During the period from t2 to t3, the accumulated energy is released to the output of the LLC resonant converter 200. As a result, the output voltage of the LLC resonant converter 200 is boosted to a suitable level such as 55 V. It should be noted that Q5 is turned off at t3 when the current flowing through Q5 is approximately equal to zero.

It should be noted that the boost conduction period TBOOST may be determined by a feedback control loop (not shown). The feedback control loop may detect a variety of signals such as the input voltage, the output voltage, the current flowing through the resonant inductor Lr, any combinations thereof and/or the like. Based upon the aforementioned signals, the feedback control loop determines the conduction period of Q6 and Q8 accordingly. Alternatively, the boost conduction period TBOOST may be a predetermined value stored in a lookup table. Depending on different applications and design needs, the boost conduction time TBOOST may vary accordingly. Furthermore, the boost conduction time TBOOST may be determined by a semi-control mechanism. In other words, the output voltage of the LLC resonant converter 200 is not tightly regulated. Instead, the output voltage of the LLC resonant converter 200 is loosely controlled.

It should further be noted that the boost operating mode shown in FIG. 3 is merely an example, which should not unduly limit the scope of the claims. One of ordinary skill in the art would recognize many variations, alternatives, and modifications. For example, in order to short the secondary side of the transformer 112, switches Q5 and Q7 may be turned on simultaneously and remain the on-state for a period. Referring back to FIG. 2, the turned-on switches Q5 and Q7 form a short at the secondary side of the transformer 112. Such a short is equivalent to the short formed by the turned-on switches Q6 and Q8.

It should further be noted that the boost converter operating mode may be enhanced by turning on switches Q6 and Q7 during the boost conduction time TBOOST. Referring back to FIG. 2, after switches Q6 and Q7 have been turned on, the voltage applied to the secondary side of the transformer 112 is equal to −Vo. As shown in FIG. 3, in the boost conduction time TBOOST, the input voltage Vin is applied across nodes T1 and T2 since switches Q1 and Q4 are turned on. The voltage applied to the resonant tank is equal to the sum of the input voltage Vin and the output voltage Vo. The resonant inductor current ramp-up rate is proportional to the voltage applied to the resonant tank. As a result, the resonant inductor current is of a greater slew rate.

The boost operating mode and the enhanced boost operating mode described above may be applied to the LLC resonant converter 200 independently. Alternatively, the boost operating mode and the enhanced boost operating mode described above may be applied to the LLC resonant converter in combination. For example, the boost operating mode and the enhanced boost operating mode are applied to the LLC resonant converter 200 in an alternating manner. In particular, the enhanced boost operating mode may be applied to the LLC resonant converter 200 in a first time segment of a switching cycle followed by the boost operating mode applied to the LLC resonant converter 200 in the second time segment of the switching cycle.

Figure 4:
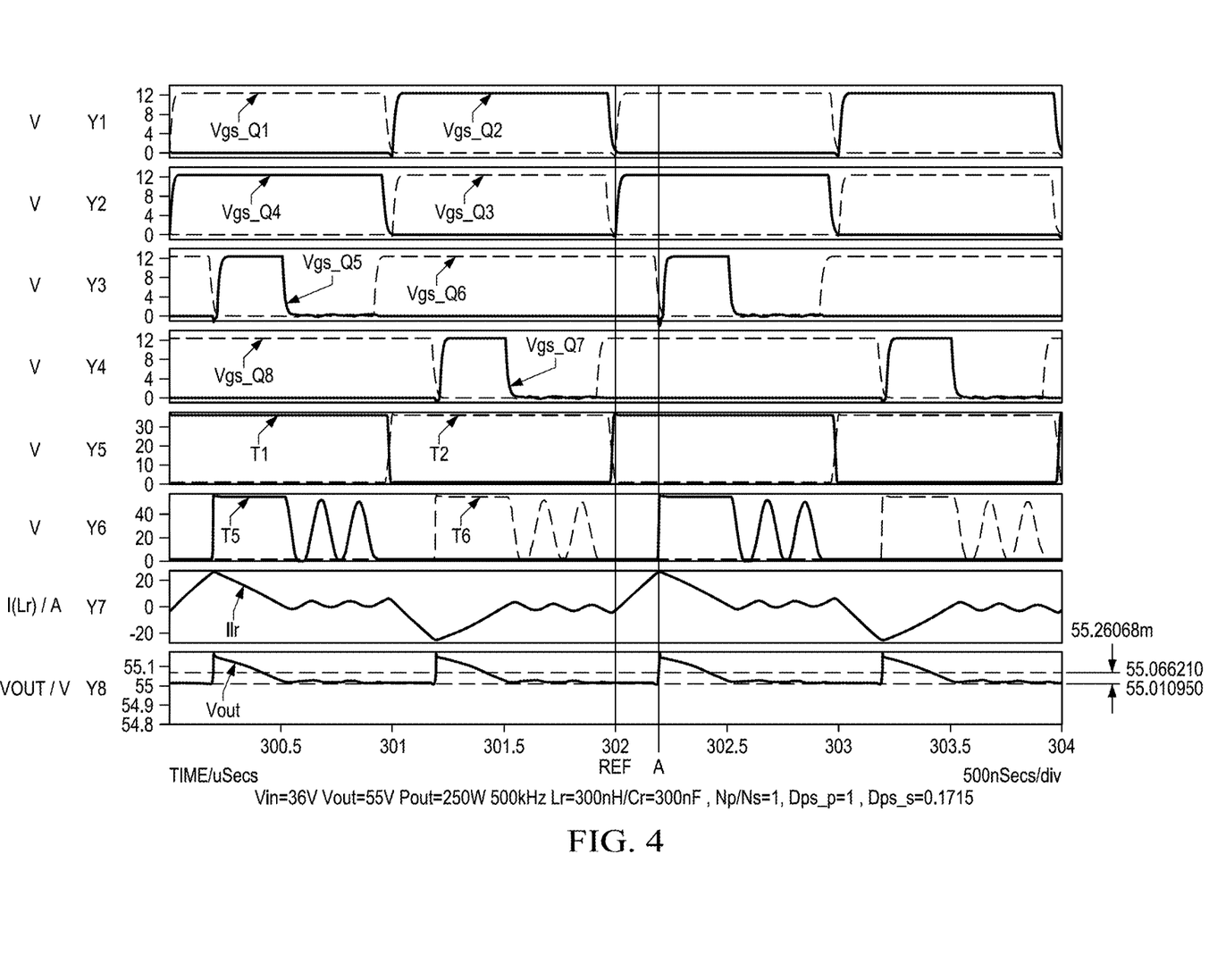
FIG. 4 illustrates switching waveforms of the LLC resonant converter operating at half load in a boost converter mode in accordance with various embodiments of the present disclosure.

FIG. 4 illustrates switching waveforms of the LLC resonant converter operating at half load in a boost converter mode in accordance with various embodiments of the present disclosure. The operating principles of the LLC resonant converter at haft load are similar to those described above with respect to FIG. 3, and hence are not discussed to further detail to avoid repetition. It should be noted that in FIG. 4 the secondary side boost operation duty cycle is reduced in comparison with the duty cycle shown in FIG. 3. At half load, the secondary boost operation duty cycle is equal to 0.17.

Figure 5:
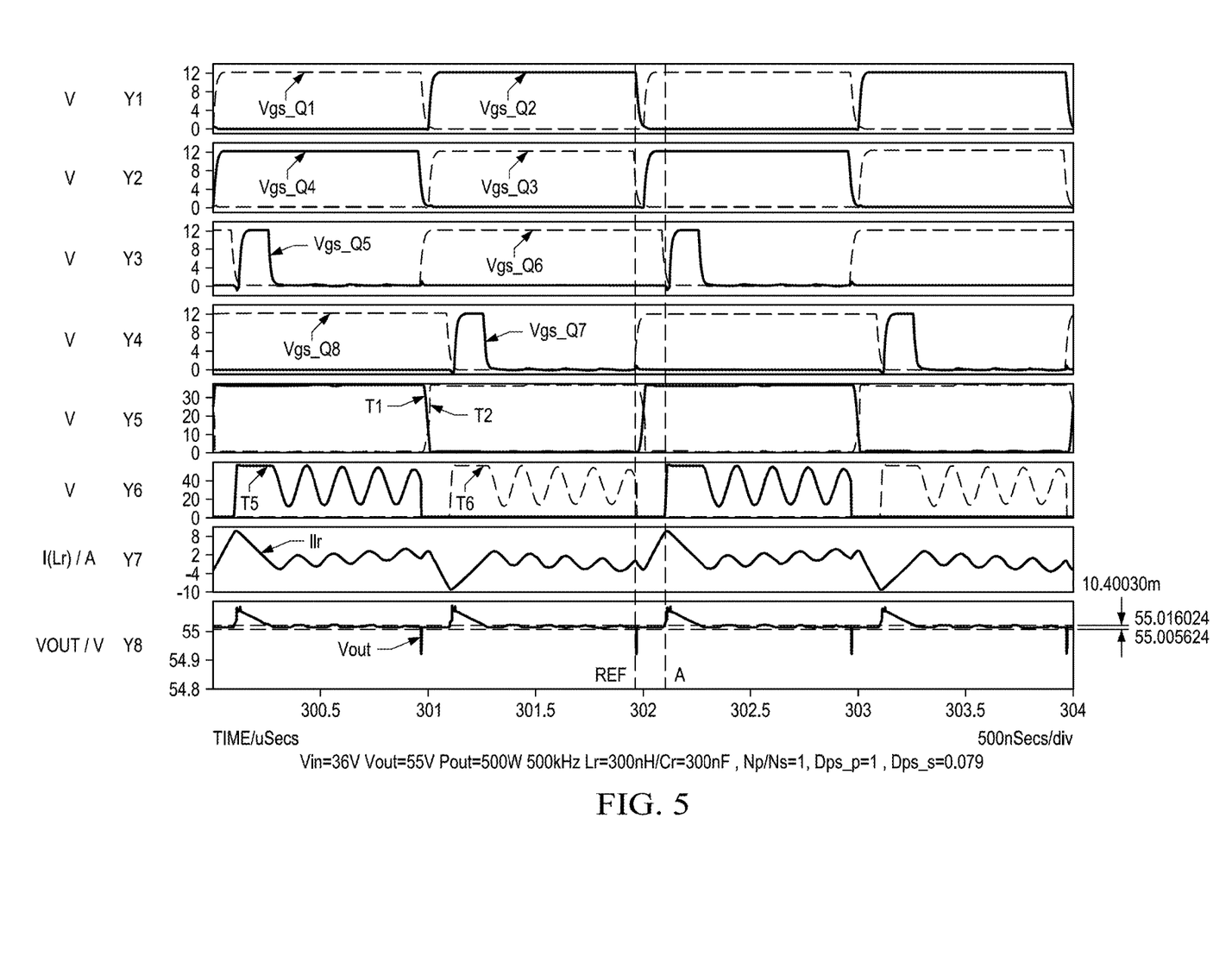
FIG. 5 illustrates switching waveforms of the LLC resonant converter operating at light load in a boost converter mode in accordance with various embodiments of the present disclosure.

FIG. 5 illustrates switching waveforms of the LLC resonant converter operating at light load in a boost converter mode in accordance with various embodiments of the present disclosure. The operating principles of the LLC resonant converter at haft load are similar to those described above with respect to FIG. 3, and hence are not discussed to further detail to avoid repetition.

In some embodiments, the light load of the LLC resonant converter 200 is equal to 50 W. It should be noted that in FIG. 5 the secondary side boost operation duty cycle is further reduced in comparison with the duty cycle shown in FIG. 3. At light load, the secondary side boost operation duty cycle is equal to 0.079.

Figure 6:
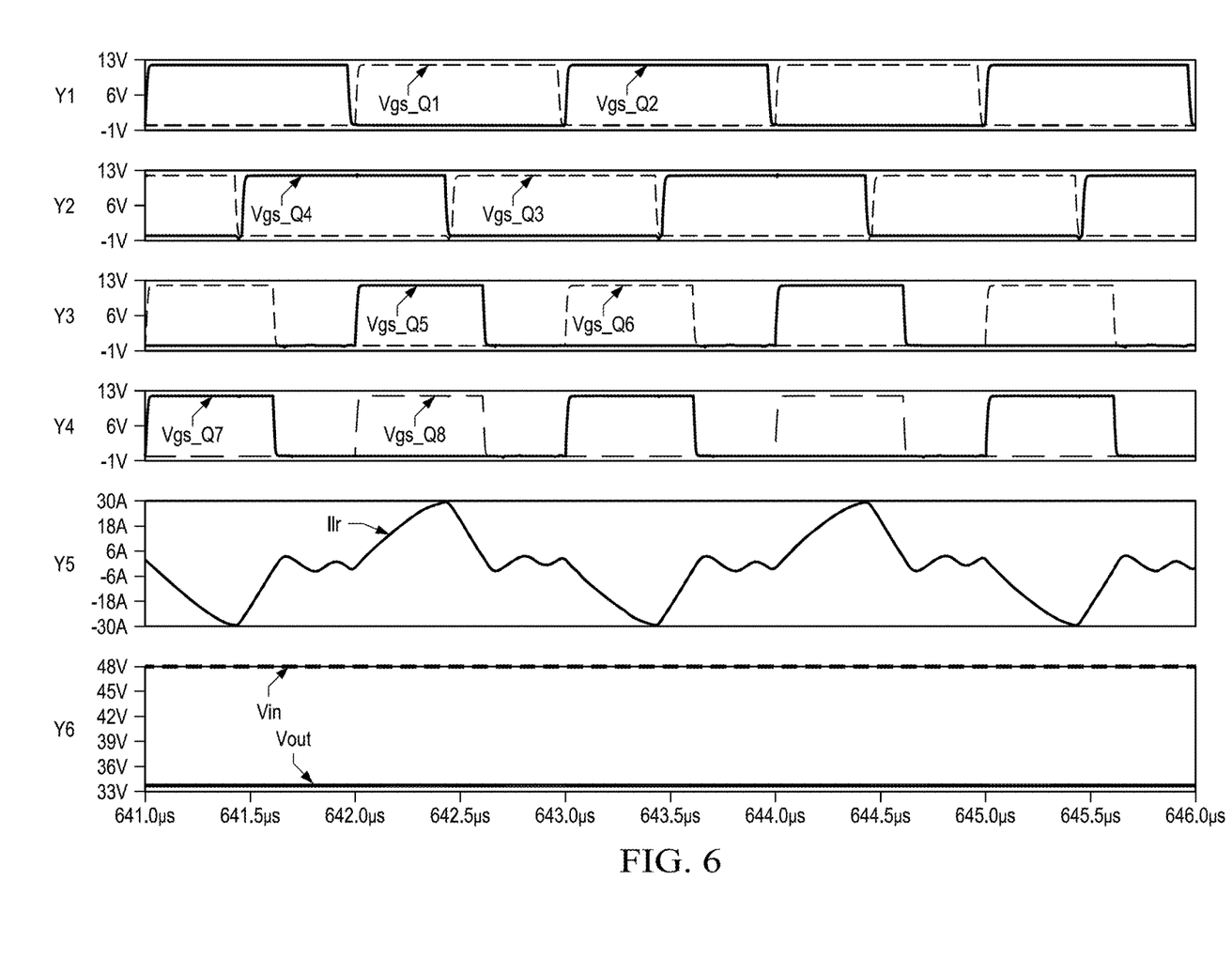
FIG. 6 illustrates switching waveforms of the LLC resonant converter operating at a buck converter mode employing a phase-shifted PWM scheme in accordance with various embodiments of the present disclosure.

FIG. 6 illustrates switching waveforms of the LLC resonant converter operating at a buck converter mode employing a phase-shifted PWM scheme in accordance with various embodiments of the present disclosure. The horizontal axis of FIG. 6 represents intervals of time. The unit of the horizontal axis is nanosecond. There may be six vertical axes. The first vertical axis Y1 represents the gate drive signals of primary switches Q1 and Q2. The second vertical axis Y2 represents the gate drive signals of primary switches Q3 and Q4. The third vertical axis Y3 represents the gate drive signals of secondary switches Q5 and Q6. The fourth vertical axis Y4 represents the gate drive signals of secondary switches Q7 and Q8.

The fifth vertical axis Y5 represents the current flowing through the resonant inductor Lr. The sixth vertical axis Y6 represents the input voltage and the output voltage of the LLC resonant converter 200.

As shown in FIG. 6, the input voltage is approximately equal to 48 V. The output voltage is approximately equal to 34 V. Since the input voltage is greater than the output voltage and the transformer turns ratio is 1:1, the LLC resonant converter 200 enters into a buck converter operating mode.

As shown in FIG. 6, the gate drive signals of Q5, Q6, Q7 and Q8 indicate the secondary switches are fully turned on. In other words, the secondary switches function as a synchronous rectifier to convert an alternating polarity waveform received from the output of the transformer 112 to a single polarity waveform.

The gate drive signals of Q1, Q2, Q3 and Q4 indicate the primary switches operate at a phase-shifted PWM mode. The buck operation duty cycle of the phase-shifted PWM mode is determined by the overlap between two primary switches (e.g., the overlap between Q2 and Q4). The operating principles of the phase-shifted PWM control mechanism are well known, and hence are not discussed in further detail herein to avoid repetition.

Figure 7:
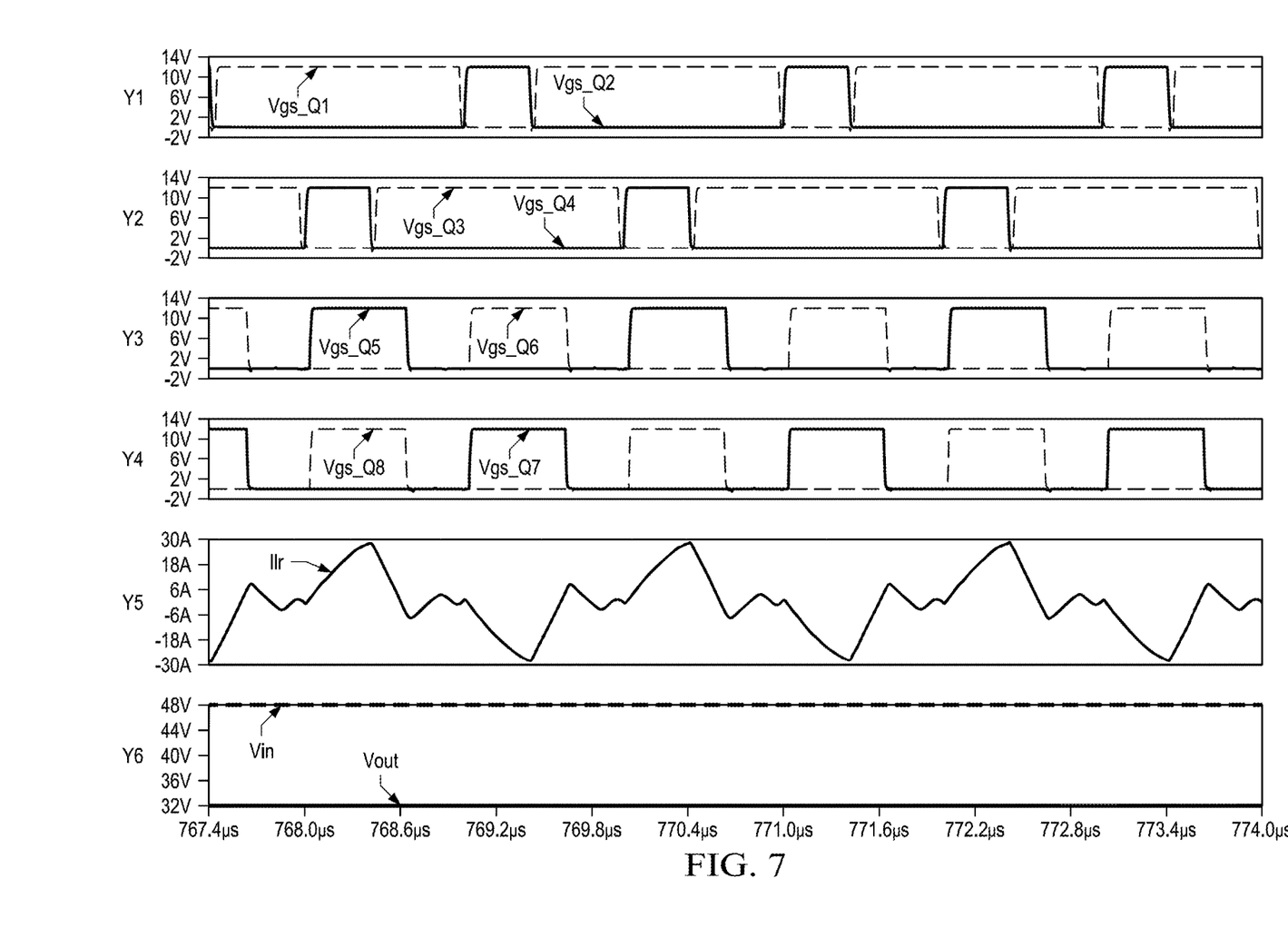
FIG. 7 illustrates switching waveforms of the LLC resonant converter operating at a buck converter mode employing an asymmetric PWM scheme in accordance with various embodiments of the present disclosure.

FIG. 7 illustrates switching waveforms of the LLC resonant converter operating at a buck converter mode employing an asymmetric PWM scheme in accordance with various embodiments of the present disclosure. The operating principles of the LLC resonant converter shown in FIG. 7 are similar to those shown in FIG. 6 except that the primary side switches Q1, Q2, Q3 and Q4 are controlled under an asymmetric PWM scheme, which is well known in the art, and hence is not discussed in further detail.

Figure 8:
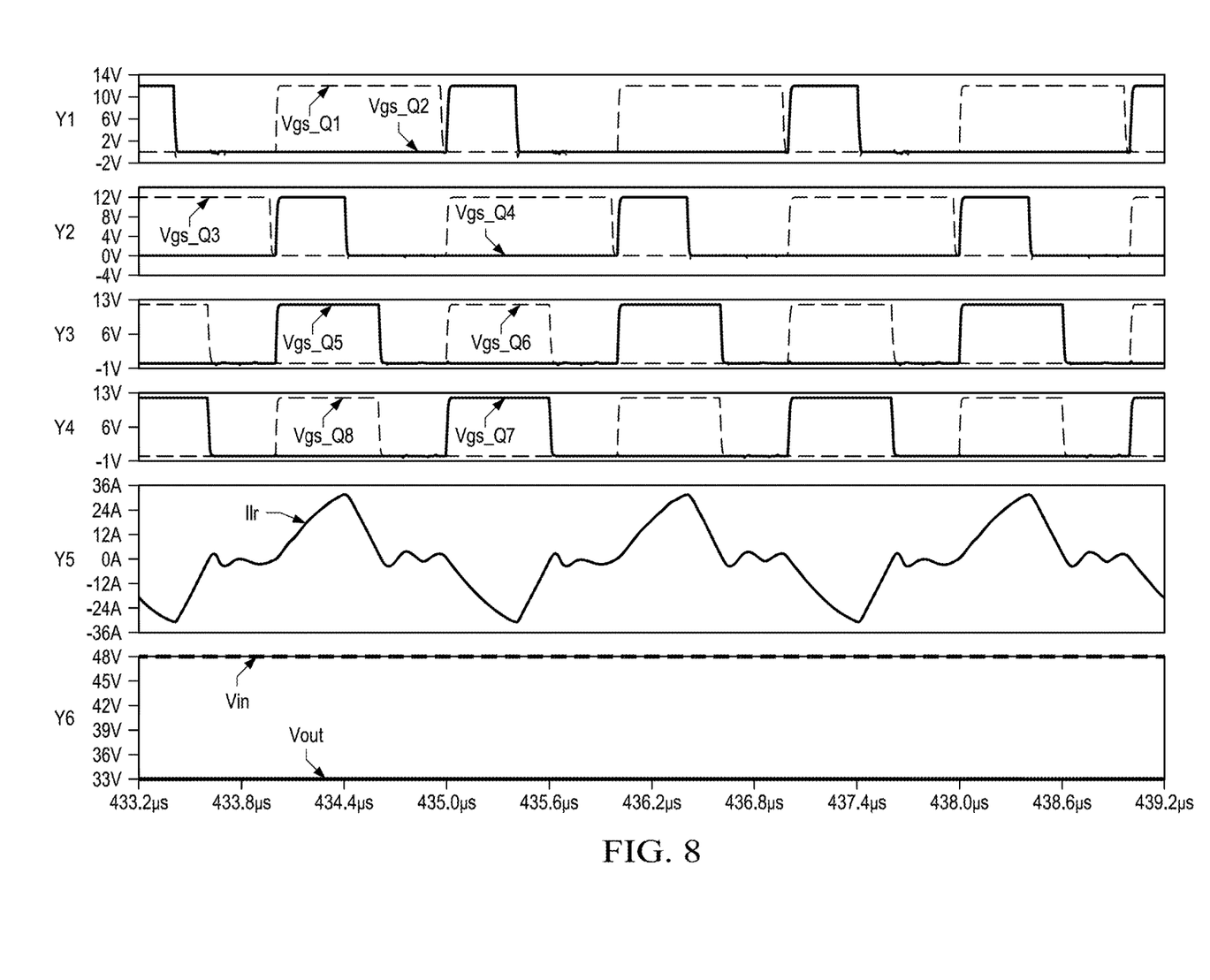
FIG. 8 illustrates switching waveforms of the LLC resonant converter operating at a buck converter mode employing a primary bottom switch PWM scheme in accordance with various embodiments of the present disclosure.

FIG. 8 illustrates switching waveforms of the LLC resonant converter operating at a buck converter mode employing a primary bottom switch PWM scheme in accordance with various embodiments of the present disclosure. The operating principles of the LLC resonant converter shown in FIG. 8 are similar to those shown in FIG. 6 except that the buck converter mode is accomplished by modulating the duty cycle of the bottom switches (e.g., Q2 and Q4). The bottom switch PWM scheme illustrated in FIG. 8 is well known in the art, and hence is not discussed in further detail.

Figure 9:
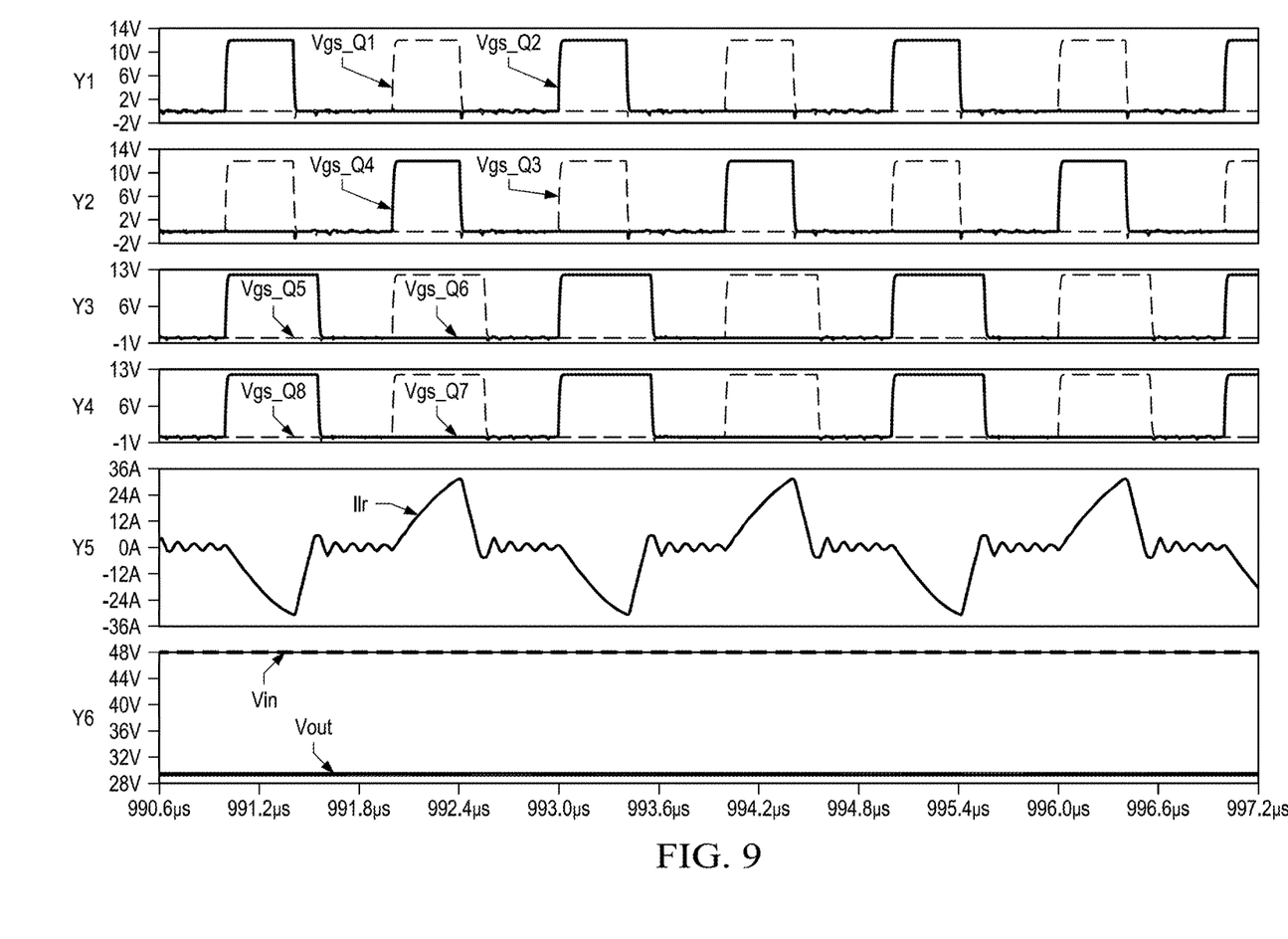
FIG. 9 illustrates switching waveforms of the LLC resonant converter operating at a buck converter mode employing a primary non-synchronous PWM scheme in accordance with various embodiments of the present disclosure.

FIG. 9 illustrates switching waveforms of the LLC resonant converter operating at a buck converter mode employing a primary non-synchronous PWM scheme in accordance with various embodiments of the present disclosure. The operating principles of the LLC resonant converter shown in FIG. 9 are similar to those shown in FIG. 6 except that the buck converter mode is accomplished by modulating the duty cycle of the primary switches (e.g., Q1-Q4). It should be noted that the efficiency of the LLC resonant converter shown in FIG. 9 may be reduced because the body diodes of the primary switches may conduct during the dead time. This PWM scheme may be suitable for LLC resonant converters having a high turns-ratio transformer. Such a high turns-ratio transformer helps to reduce the primary current so as to minimize the power losses from the non-synchronous operation of the primary switches.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining an operating mode based upon an input voltage and an output voltage of a resonant converter comprising:
   a switch network coupled to an input dc power source and a resonant tank, wherein a transformer is coupled between the resonant tank and a full-bridge secondary rectifier;
   configuring the switch network to operate at a buck converter mode by controlling on and off of switches of the switch network;
   configuring the full-bridge secondary rectifier to operate at a boost converter mode by shorting a secondary side winding of the transformer;
   configuring the switch network to operate at the buck converter mode in response to a first input voltage from the input dc power source; and
   configuring the full-bridge secondary rectifier to operate at the boost converter mode in response to a second input voltage from the input dc power source, wherein:
   the first input voltage is higher than the output voltage of the resonant converter; and
   the second input voltage is lower than the output voltage of the resonant converter.

2. The method of claim 1, further comprising:
   in the buck converter mode, controlling the switches of the switch network based on a phase-shift PWM scheme; and
   in the boost converter mode, shorting the secondary side winding of the transformer by turning on two switches of the full-bridge secondary rectifier.

3. The method of claim 1, further comprising:
   in the buck converter mode, controlling the switches of the switch network based on a frequency modulation scheme; and
   in the boost converter mode, shorting a secondary side winding of the transformer by turning on two switches of the full-bridge secondary rectifier.

4. The method of claim 1, further comprising:
   in the buck converter mode, controlling the switches of the switch network based on an asymmetric PWM scheme; and
   in the boost converter mode, shorting a secondary side winding of the transformer by turning on two switches of the full-bridge secondary rectifier.

5. The method of claim 1, further comprising:
   in the buck converter mode, controlling two bottom switches of the switch network based on a PWM modulation scheme, wherein the switch network is a full bridge; and
   in the boost converter mode, shorting a secondary side winding of the transformer by turning on two switches of the full-bridge secondary rectifier.

6. The method of claim 1, wherein the full-bridge secondary rectifier comprises four switches, and wherein:
   a first switch and a second switch are connected in series and further coupled between two terminals of an output capacitor; and
   a third switch and a fourth switch are connected in series and further coupled between the two terminals of the output capacitor.

7. The method of claim 6, wherein:
   a secondary side winding of the transformer has a first terminal connected to a common node of the first switch and the second switch, and a second terminal connected to a common node of the third switch and the fourth switch.

8. The method of claim 7, further comprising:
   simultaneously turning on the second switch and the fourth switch to short the secondary side winding of the transformer in the boost converter mode.

9. The method of claim 7, further comprising:
   simultaneously turning on the first switch and the third switch to short the secondary side winding of the transformer in the boost converter mode.

10. A system comprising:
    a switching network configured to be connected with an input dc power sourceand operate at a buck converter mode in response to a first input voltage from the input dc power source;
    a resonant tank coupled between the switching network and a primary side of a transformer; and
    a rectifier coupled between a secondary side of the transformer and an output capacitor and configured to operate at a boost converter mode by shorting a secondary side winding of the transformer in response to a second input voltage from the input dc power source, wherein:
    the first input voltage is higher than a voltage across the output capacitor; and
    the second input voltage is lower than the voltage across the output capacitor.

11. The system of claim 10, wherein the rectifier is a full-bridge rectifier comprising:
    a first switch and a second switch are connected in series and further coupled between two terminals of an output capacitor; and a third switch and a fourth switch are connected in series and further coupled between the two terminals of the output capacitor.

12. The system of claim 11, wherein:
the secondary side winding of the transformer has a first terminal connected to a common node of the first switch and the second switch, and a second terminal connected to a common node of the third switch and the fourth switch.

13. The system of claim 11, wherein:
the second switch and the fourth switch are configured to be simultaneously turned on to short the secondary side winding of the transformer.

14. A method comprising:
enabling a resonant converter that comprising:
  a switch network coupled to an input dc power source;
  a resonant tank coupled to the switch network; and
  a transformer coupled between the resonant tank and a full-bridge secondary rectifier;
in response to an output voltage of the input dc power source, determining an operating mode;
configuring the switch network to operate at a buck converter mode in response to a first input voltage by controlling on and off of switches of the switch network; and
configuring the full-bridge secondary rectifier to operate at a boost converter mode in response to a second input voltage by shorting a secondary winding of the transformer, wherein:
  the first input voltage is higher than an output voltage of the resonant converter; and
  the second input voltage is lower than the output voltage of the resonant converter.

15. The method of claim 14, wherein:
the switch network comprises:
  a first primary switch and a second primary switch connected in series and further coupled between two terminals of the input dc power source; and
  a third primary switch and a fourth primary switch connected in series and further coupled between two terminals of the input dc power source;
a first terminal of a primary winding of the transformer is coupled to a common node of the first primary switch and the second primary switch through the resonant tank;
a second terminal of the primary winding of the transformer is coupled to a common node of the third primary switch and the fourth primary switch;
the full-bridge secondary rectifier comprises four switches, and wherein:
  a first switch and a second switch are connected in series and further coupled between two terminals of an output capacitor; and
  a third switch and a fourth switch are connected in series and further coupled between the two terminals of the output capacitor;
a first terminal of the secondary winding of the transformer is coupled to a common node of the first switch and the second switch; and
a second terminal of the secondary winding of the transformer is coupled to a common node of the third switch and the fourth switch, and wherein the first terminal of the secondary winding and the first terminal of the primary winding share a same polarity.

16. The method of claim 15, further comprising:
in the boost converter mode, simultaneously turning on both the second switch and the fourth switch.

17. The method of claim 15, wherein:
in the boost converter mode, simultaneously turning on both the first switch and the third switch.

18. The method of claim 15, further comprising:
in the boost converter mode, simultaneously turning on both the second switch and the third switch when the first primary switch and the fourth primary switch are turned on.

19. The method of claim 15, further comprising:
in a first boost converter mode, simultaneously turning on both the second switch and the fourth switch; and
in a second boost converter mode, simultaneously turning on both the second switch and the third switch when the first primary switch and the fourth primary switch are turned on, wherein the first boost converter mode and the second boost converter mode are applied in an alternating manner.

* * * * *